US012560064B2

(12) United States Patent
Zhang et al.

(10) Patent No.: US 12,560,064 B2
(45) **Date of Patent: \*Feb. 24, 2026**

(54) SEMI-TRAILER-LOADED TURBINE FRACTURING EQUIPMENT

(71) Applicant: YANTAI JEREH PETROLEUM EQUIPMENT & TECHNOLOGIES CO., LTD., Shandong (CN)

(72) Inventors: Rikui Zhang, Shandong (CN); Sheng Chang, Shandong (CN); Peng Zhang, Shandong (CN); Chunqiang Lan, Shandong (CN); Yipeng Wu, Shandong (CN); Xincheng Li, Shandong (CN); Xiance Li, Shandong (CN)

(73) Assignee: Yantai Jereh Petroleum Equipment & Technologies Co., Ltd., Yantai (CN)

( \* ) Notice: Subject to any disclaimer, the term of this patent is extended or adjusted under 35 U.S.C. 154(b) by 0 days.

This patent is subject to a terminal disclaimer.

(21) Appl. No.: 18/521,619

(22) Filed: Nov. 28, 2023

(65) Prior Publication Data

US 2024/0093680 A1 Mar. 21, 2024

Related U.S. Application Data

(63) Continuation of application No. 18/047,863, filed on Oct. 19, 2022, now Pat. No. 11,828,277, which is a
(Continued)

(30) Foreign Application Priority Data

Sep. 20, 2019 (CN) .......................... 201910894228.2
Sep. 20, 2019 (CN) .......................... 201910894253.0
(Continued)

(51) Int. Cl.
*E21B 43/26* (2006.01)
*F04B 1/04* (2020.01)
(Continued)

(52) U.S. Cl.
CPC ............ *E21B 43/2607* (2020.05); *F04B 1/04* (2013.01); *F04B 1/053* (2013.01); *F04B 9/02* (2013.01);
(Continued)

(58) Field of Classification Search
CPC .... F04B 1/04; F04B 1/053; F04B 9/02; F04B 15/02; F04B 17/06; E21B 43/2607; F16H 1/02; F16H 1/28
See application file for complete search history.

(56) References Cited

U.S. PATENT DOCUMENTS 2,988,153 A 6/1961 Haworth et al.
3,350,138 A \* 10/1967 Wilms ................... E21C 27/30
299/33
(Continued)

FOREIGN PATENT DOCUMENTS

CA 2944968 8/2016
CN 2625578 Y 7/2004
(Continued)

OTHER PUBLICATIONS

Machine translation of Chinese-language Search Report issued in Chinese Application No. 2023104191223 dated Jul. 28, 2025 (4 pages). (Year: 2025).\*
(Continued)

*Primary Examiner* — Charles G Freay
(74) *Attorney, Agent, or Firm* — Crowell & Moring LLP

(57) ABSTRACT

The present invention discloses a semi-trailer-loaded turbine fracturing equipment, which adopts a linear connection of the whole equipment and a special chassis design, so that the center of gravity is double lowered to guarantee its stability and safety, the structure is simpler, the investment and operation costs are decreased, the risk of total breakdown of the fracturing site is reduced, and the equipment has a good
(Continued)

2-1    2-2    2-3

2-4    2-5 transmission performance and is suitable for continuous operation conditions with long time and heavy load. The plunger pump is improved in that the distance between the center of rotation of the bellcrank and the center of rotation of the crankshaft is optimized so that the rated input power is increased to 5000-7000 hp, the transmission ratio of the reduction gearbox integrated on the plunger pump is optimized so that the maximum input speed can reach 16000 rpm, the superhigh speed allows the reduction gearbox to be connected directly to the turbine engine to address the problem that the turbine fracturing equipment is decelerated through two reduction gearboxes, thus decreasing the weight of the vehicle and reducing the overall size of the equipment.

17 Claims, 7 Drawing Sheets

Related U.S. Application Data continuation of application No. 17/829,881, filed on Jun. 1, 2022, now Pat. No. 11,519,395, which is a continuation-in-part of application No. 17/531,817, filed on Nov. 22, 2021, now Pat. No. 11,788,519, and a continuation-in-part of application No. 16/838,806, filed on Apr. 2, 2020, now abandoned, and a continuation-in-part of application No. 16/838,802, filed on Apr. 2, 2020, now abandoned, and a continuation-in-part of application No. 16/832,205, filed on Mar. 27, 2020, now abandoned, said application No. 17/531, 817 is a continuation of application No. 16/832,191, filed on Mar. 27, 2020, now Pat. No. 11,242,737.

(30)        Foreign Application Priority Data

| Sep. 20, 2019 | (CN) | ......................... 201910894306.9 |
| Sep. 20, 2019 | (CN) | ......................... 201910894342.5 |

(51)  Int. Cl.

| F04B 1/053 | (2020.01) |
| F04B 9/02 | (2006.01) |
| F04B 15/02 | (2006.01) |
| F04B 17/05 | (2006.01) |
| F04B 17/06 | (2006.01) |
| F16H 1/02 | (2006.01) |
| F16H 1/28 | (2006.01) |

(52)  U.S. Cl.
CPC ............. *F04B 15/02* (2013.01); *F04B 17/05* (2013.01); *F04B 17/06* (2013.01); *F16H 1/02* (2013.01); *F16H 1/28* (2013.01)

(56)        References Cited

U.S. PATENT DOCUMENTS

| 3,400,609 A | 9/1968 | Utter |
| 3,418,485 A | 12/1968 | Anderson et al. |
| 3,791,682 A | 2/1974 | Mitchell |
| 3,881,841 A | 5/1975 | Straniti |
| 4,341,071 A | 7/1982 | Abo et al. |
| 5,435,975 A | 7/1995 | Bastos |
| 5,517,822 A | 5/1996 | Haws et al. |
| 5,709,076 A | 1/1998 | Lawlor |
| 6,230,481 B1 | 5/2001 | Jahr |
| 6,446,425 B1 | 9/2002 | Lawlor |
| 7,028,461 B2 | 4/2006 | Goi |
| 7,036,318 B1 | 5/2006 | Munson, Jr. |
| 7,506,574 B2 | 3/2009 | Jensen et al. |
| 7,552,903 B2 | 6/2009 | Dunn et al. |

| 7,845,413 B2 | 12/2010 | Shampine et al. |
| 8,506,267 B2 | 8/2013 | Gambier |
| 8,567,354 B2 | 10/2013 | Kealy et al. |
| 8,621,873 B2 | 1/2014 | Robertson et al. |
| 8,801,394 B2 | 8/2014 | Anderson |
| 9,534,473 B2 | 1/2017 | Morris et al. |
| 9,650,879 B2 | 5/2017 | Broussard |
| 10,030,579 B2 * | 7/2018 | Austin ..................... F16M 3/00 |
| 10,060,293 B2 | 8/2018 | Del Bono |
| 10,371,012 B2 | 8/2019 | Davis et al. |
| 10,815,764 B1 * | 10/2020 | Yeung ................. E21B 43/2607 |
| 10,865,631 B1 | 12/2020 | Zhang et al. |
| 10,954,770 B1 | 3/2021 | Yeung et al. |
| 10,961,993 B1 | 3/2021 | Ji et al. |
| 10,968,837 B1 | 4/2021 | Yeung et al. |
| 11,111,768 B1 | 9/2021 | Yeung et al. |
| 11,181,046 B1 | 11/2021 | Brooks et al. |
| 11,242,737 B2 | 2/2022 | Zhang |
| 11,499,405 B2 | 11/2022 | Zhang |
| 11,519,395 B2 * | 12/2022 | Zhang ..................... F04B 15/02 |
| 11,828,277 B2 * | 11/2023 | Zhang ..................... F04B 17/05 |
| 2003/0004029 A1 | 1/2003 | Lagarde et al. |
| 2003/0171184 A1 | 9/2003 | Wige |
| 2004/0050049 A1 | 3/2004 | Wendt et al. |
| 2005/0221946 A1 | 10/2005 | Mitrovic |
| 2007/0213171 A1 | 9/2007 | Pizzichil et al. |
| 2007/0277982 A1 | 12/2007 | Shampine et al. |
| 2009/0068031 A1 | 3/2009 | Gambier et al. |
| 2010/0033148 A1 | 2/2010 | Tsai |
| 2010/0071899 A1 | 3/2010 | Coquilleau et al. |
| 2011/0085924 A1 | 4/2011 | Shampine et al. |
| 2011/0171044 A1 | 7/2011 | Flanigan |
| 2013/0112029 A1 | 5/2013 | Slayter et al. |
| 2013/0209236 A1 | 8/2013 | Xu |
| 2014/0144641 A1 | 5/2014 | Chandler |
| 2014/0174717 A1 | 6/2014 | Broussard et al. |
| 2014/0219824 A1 | 8/2014 | Burnette |
| 2014/0274557 A1 | 9/2014 | Chong |
| 2014/0322034 A1 | 10/2014 | Bayyouk |
| 2015/0184591 A1 | 7/2015 | Giancotti et al. |
| 2015/0247421 A1 | 9/2015 | Wojick et al. |
| 2015/0252661 A1 | 9/2015 | Glass |
| 2015/0275891 A1 | 10/2015 | Chong |
| 2015/0377318 A1 | 12/2015 | Byrne |
| 2015/0381013 A1 | 12/2015 | Davies et al. |
| 2016/0047305 A1 | 2/2016 | Wickert et al. |
| 2016/0102581 A1 | 4/2016 | Del Bono |
| 2016/0169322 A1 | 6/2016 | Ono |
| 2016/0177678 A1 | 6/2016 | Morris et al. |
| 2016/0218650 A1 | 7/2016 | Gajanayake et al. |
| 2016/0230525 A1 | 8/2016 | Lestz et al. |
| 2016/0281484 A1 | 9/2016 | Lestz et al. |
| 2016/0341124 A1 | 11/2016 | Ross et al. |
| 2016/0348479 A1 | 12/2016 | Oehring et al. |
| 2017/0023014 A1 | 1/2017 | Clemen et al. |
| 2017/0082110 A1 | 3/2017 | Lammers |
| 2017/0089189 A1 | 3/2017 | Norris et al. |
| 2017/0104389 A1 | 4/2017 | Morris et al. |
| 2017/0218727 A1 | 8/2017 | Oehring et al. |
| 2017/0234308 A1 * | 8/2017 | Buckley ................. F04B 53/22 |
| | | 417/53 |
| 2017/0292789 A1 | 10/2017 | Hjorth et al. |
| 2018/0111807 A1 | 4/2018 | Snider |
| 2018/0266412 A1 | 9/2018 | Stokkevag et al. |
| 2018/0283464 A1 | 10/2018 | Altamura |
| 2019/0063309 A1 | 2/2019 | Davis |
| 2019/0067991 A1 | 2/2019 | Davis et al. |
| 2019/0068026 A1 | 2/2019 | Davis |
| 2019/0178235 A1 | 6/2019 | Coskrey et al. |
| 2019/0211661 A1 * | 7/2019 | Reckels ................... F02C 6/00 |
| 2019/0338762 A1 | 11/2019 | Curry et al. |
| 2020/0040878 A1 | 2/2020 | Morris et al. |
| 2020/0049136 A1 | 2/2020 | Stephenson |
| 2020/0056458 A1 | 2/2020 | Mao et al. |
| 2020/0108364 A1 | 4/2020 | Glass |
| 2020/0109616 A1 | 4/2020 | Oehring et al. |
| 2020/0325761 A1 | 10/2020 | Williams |
| 2020/0332784 A1 | 10/2020 | Zhang et al. |
| 2020/0340344 A1 | 10/2020 | Reckels et al. |

(56) References Cited

U.S. PATENT DOCUMENTS

| | | | |
|---|---|---|---|
| 2020/0370633 A1 | 11/2020 | Kumar | |
| 2020/0392826 A1 | 12/2020 | Cui et al. | |
| 2020/0400005 A1 | 12/2020 | Han et al. | |
| 2021/0025383 A1 | 1/2021 | Bodishbaugh | |
| 2021/0079902 A1 | 3/2021 | Yeung et al. | |
| 2021/0102531 A1 | 4/2021 | Bodishbaugh et al. | |
| 2021/0308638 A1 | 10/2021 | Zhong et al. | |
| 2021/0372256 A1 | 12/2021 | Yeung et al. | |
| 2021/0381358 A1 | 12/2021 | Yeung | |
| 2021/0404309 A1 | 12/2021 | Yeung et al. | |
| 2022/0213777 A1 | 7/2022 | Cui et al. | |
| 2022/0259964 A1 | 8/2022 | Zhang | |
| 2022/0307359 A1 | 9/2022 | Liu et al. | |

FOREIGN PATENT DOCUMENTS

| | | | |
|---|---|---|---|
| CN | 201159100 Y | 12/2008 | |
| CN | 101879918 A | 11/2010 | |
| CN | 201646518 U | 11/2010 | |
| CN | 201863895 U | 6/2011 | |
| CN | 102136778 A | 7/2011 | |
| CN | 102602323 A | 7/2012 | |
| CN | 202673269 U | 1/2013 | |
| CN | 202763319 U | 3/2013 | |
| CN | 202926404 U | 5/2013 | |
| CN | 202935216 U | 5/2013 | |
| CN | 203189630 U | 9/2013 | |
| CN | 203962367 U | 11/2014 | |
| CN | 105065224 A | 11/2015 | |
| CN | 205117343 U | 3/2016 | |
| CN | 105545666 A | 5/2016 | |
| CN | 105703535 A | 6/2016 | |
| CN | 106089175 A | 11/2016 | |
| CN | 107208557 A | 9/2017 | |
| CN | 107476837 A | 12/2017 | |
| CN | 107544304 A | 1/2018 | |
| CN | 107939342 A | 4/2018 | |
| CN | 208862781 U | 5/2019 | |
| CN | 109869294 A | 6/2019 | |
| CN | 109882144 A | 6/2019 | |
| CN | 109906305 A | 6/2019 | |
| CN | 208982122 U | 6/2019 | |
| CN | 107461253 B | 8/2019 | |
| CN | 110118127 A | 8/2019 | |
| CN | 110145399 A | 8/2019 | |
| CN | 110374745 A | 10/2019 | |
| CN | 110469314 A | 11/2019 | |
| CN | 110469405 A | 11/2019 | |
| CN | 110500255 A | 11/2019 | |
| CN | 110513097 A | 11/2019 | |
| CN | 209586278 U | 11/2019 | |
| CN | 209586287 U | 11/2019 | |
| CN | 110735713 A | 1/2020 | |
| CN | 110821464 A | 2/2020 | |
| CN | 210714958 U | 6/2020 | |
| CN | 210985525 A | 7/2020 | |
| CN | 111594314 A | 8/2020 | |
| CN | 111946504 A | 11/2020 | |
| CN | 112343676 A | 2/2021 | |
| CN | 112682172 A | 4/2021 | |
| DE | 102015213625 A1 | 1/2017 | |
| FR | 2890438 A1 | 3/2013 | |
| KR | 101861753 B1 | 5/2018 | |
| WO | WO 2019/204323 A1 | 10/2019 | |

OTHER PUBLICATIONS

Machine translation of Chinese-Language Office Action issued in Chinese Application No. 202310419122.3 dated Jul. 30, 2026 (12 pages). (Year: 2025).*

International Search Report, dated Jun. 5, 2020, pp. 1-4, issued in International Patent Application No. PCT/CN2019/107019, China Intellectual Property Administration, Beijing, China.

International Search Report, dated Jun. 5, 2020, pp. 1-4, issued in International Patent Application No. PCT/CN2019/107020, China Intellectual Property Administration, Beijing, China.

International Search Report, dated Jun. 5, 2020, pp. 1-4, issued in International Patent Application No. PCT/CN2019/107021, China Intellectual Property Administration, Beijing, China.

International Search Report, dated Jun. 10, 2020, pp. 1-4, issued in International Patent Application No. PCT/CN2019/107023, China Intellectual Property Administration, Beijing, China.

International Search Report, dated May 14, 2020, pp. 1-4, issued in International Patent Application No. PCT/CN2019/107026, China Intellectual Property Administration, Beijing, China.

International Search Report, dated Sep. 26, 2021, pp. 1-4, issued in International Patent Application No. PCT/CN2019/095646, China Intellectual Property Administration, Beijing, China.

Office Action issued in related U.S. Appl. No. 18/456,223 dated Jan. 27, 2025, 7 pages.

Chinese-language Office Action issued in Chinese Application No. 201910894228.2 dated Sep. 17, 2025 (6 pages).

* cited by examiner

215 FIG 5-6

SEMI-TRAILER-LOADED TURBINE FRACTURING EQUIPMENT

CROSS REFERENCE

This application is a continuation application of and claims the benefit of priority to U.S. patent application Ser. No. 18/047,863, now issued as U.S. Pat. No. 11,828,277, filed on Oct. 19, 2022, which is a continuation application and claims the benefit of priority to U.S. patent application Ser. No. 17/829,881 filed on Jun. 1, 2022, issued as U.S. Pat. No. 11,519,395, which is a continuation or continuation-in-part of and claims priority to (1) U.S. patent application Ser. No. 16/838,802, filed on Apr. 2, 2020, which is based on and claims priority to Chinese Patent Application No. CN 201910894306.9 filed on Sep. 20, 2019, (2) U.S. patent application Ser. No. 16/838,806, filed on Apr. 2, 2020, which is based on and claims priority to Chinese Patent Application No. CN 201910894342.5 filed on Sep. 20, 2019, (3) U.S. patent application Ser. No. 17/531,817, filed on Nov. 22, 2021, issued as U.S. Pat. No. 11,788,519, which is a continuation of and claims priority to U.S. patent application Ser. No. 16/832,191, issued as U.S. Pat. No. 11,242,737, filed on Mar. 27, 2020, which is based on and claims priority to Chinese Patent Application No. CN 201910894253.0, filed on Sep. 20, 2019, and (4) U.S. patent application Ser. No. 16/832,205, filed on Mar. 27, 2020, which is based on and claims priority to Chinese Patent Application No. CN 201910894228.2 filed on Sep. 20, 2019. These U.S. and Chinese Patent Application are herein incorporated by reference in their entireties.

TECHNICAL FIELD

The present invention relates generally to the technical field of oil and gas field operations, and specifically to a turbine-driven fracturing system on a semi-trailer.

BACKGROUND

For extracting oil/gas by facture formation in oil/gas fields, a power source may be configured to drive various fracturing equipment/systems in various alternative manners.

The fracturing equipment may be driven by diesel engine(s). For example, a diesel engine may be connected/coupled to a transmission mechanism through a transmission shaft to drive a fracturing plunger pump to generate and deliver high-pressure fluid into a wellhead for fracture formation. In other words, a diesel engine may be used as the power source, whereas a transmission and a transmission shaft may be utilized as the transmission devices, and a plunger pump may be used as the hydraulic pressure production element.

This example configuration may be associated with the following disadvantages:

(1) Large volume and excessive weight. When a diesel engine is utilized to drive a fracturing plunger pump through a transmission a transmission shaft, a relatively large equipment volume is needed. The overall system is heavy, thereby redistricting transportation of such systems and limiting the power density with respect to the equipment weight;

(2) Environmental impact. During operations at a well site, the fracturing equipment driven by the diesel engine would generate engine exhaust pollution and noise pollution. The noise may exceed, e.g., 105 dBA and may severely affect the normal life of nearby residents;

(3) Cost inefficiency: The fracturing equipment driven by a diesel engine requires relatively high initial purchase cost and incurs high fuel consumption costs per unit power generation during operation, and the engine and the transmission also require very high routine maintenance costs.

Another driving mode may be based on electric-drive fracturing. Specifically, an electric motor may be connected to a transmission shaft or a coupling to drive the fracturing plunger pump. In other words, an electric motor may be utilized as the mechanical power source. A transmission shaft or a coupling may be utilized as the transmission device, and a fracturing plunger pump may be used as the fracturing fluid displacement generation device.

Although the electric-drive fracturing mode may be associated with many advantages, it requires an electric power supply on fracturing well sites. Generally, it is difficult to supply electric power to fracturing well sites in that the typical electric power capacity at the well sites may be insufficient to drive the whole fracturing units, or there is lack of power networks at well site. Therefore, for implementing electric-drive fracturing, electric generators may be employed to generate electricity. The most economical fuel for electricity generation may be natural gas. As such, natural gas electric generators may be employed in order to control fuel cost. For a fracturing wellsite having no external power networks (e.g., electric grid), the power generation of a set of gas generators may need to be, for example, least 30 MW. Gas electric generator with such capacity is usually exceedingly expensive. A single high-power electric generator also forms a single failure point.

SUMMARY

The present disclosure is directed to a system for fracturing operation in oil/gas fields. The disclosed fracturing system is integrated onto a semitrailer that can be conveniently transported to any oil field. The disclosed fracturing system further includes major components needed for delivering high-pressure fracturing fluid into a wellhead, including but not limited to at least one power generation source and at least one plunger pump driven by the at least one power generation source via simple transmission mechanisms utilizing reduction gearbox and/or transmission shafts. The power generation source, in particular, includes a turbine engine capable of being powered by 100% natural gasified liquid fuel. The fracturing system further includes hydraulic and cooling component for serving the various needs for the turbine engine, the reduction gearbox, and the plunger pump, such as lubrication of various moving parts.

In some example implementations, a turbine fracturing semi-trailer system is disclosed. The turbine fracturing semi-trailer may include a semi-trailer body; a turbine engine comprising a rotational output end associated with a first rotational axis; a first reduction gearbox assembly comprising a first planetary gearset engaging a parallel gearset engaging a second planetary gearset, the first planetary gearset and the second planetary gearset being associated with a second rotational axis and a third rotational axis, respectively; and a plunger pump comprising a crankcase associated a fourth rotational axis. The turbine engine, the first reduction gearbox assembly and the plunger pump are sequentially disposed on the semi-trailer body. The first rotational axis is colinearly aligned and coupled to the second rotational axis; the third rotational axis is colinearly aligned and coupled to the fourth rotational axis. The first rotational axis and the fourth rotational axis are offset from one another more horizontally than vertically when the turbine fracturing semi-trailer system is in an operational state.

In the implementations above, the turbine fracturing semi-trailer system according to claim 1, wherein the first reduction gearbox assembly is integrated with the plunger pump.

In any one of the implementations above, the turbine fracturing semi-trailer system may further include a transmission device disposed between the turbine engine and the first reduction gearbox assembly.

In any one of the implementations above, the turbine fracturing semi-trailer system may further include a second reduction gearbox assembly disposed between the turbine engine and the first reduction gearbox assembly.

In any one of the implementations above, the turbine fracturing semi-trailer system may further include a transmission device disposed between the first reduction gearbox assembly and the second reduction gearbox assembly.

In any one of the implementations above, the transmission device comprises a single rotational shaft.

In any one of the implementations above, the turbine engine may further include an exhaust system disposed on an opposite side of the first reduction gearbox assembly, and the exhaust system comprises an exhaust silencer and an exhaust piping, the exhaust silencer is communicated with an exhaust port of the turbine engine through the exhaust piping.

In any one of the implementations above, the exhaust system, the turbine engine, the first reduction gearbox assembly, and the plunger pump are sequentially disposed in a straight line along a transmission direction of rotational power.

In any one of the implementations above, an air intake system may be disposed on the semi-trailer body above the turbine engine. The air intake system comprises a plurality of air intake filters, an air intake silencer, and an air intake duct. One end of the air intake silencer is connected to the air intake filter. The other end of the air intake silencer is connected to one end of the air intake duct. The other end of the air intake duct is connected to an air intake port of the turbine engine.

In any one of the implementations above, the plurality of air intake filters may be disposed on two sides of the air intake system along a direction of power transmission of the turbine fracturing semi-trailer system and extend at least an entire length of the turbine engine.

In any one of the implementations above, the turbine fracturing semi-trailer system may further include a plurality of inertia separator over the plurality of air intake filters for separating solid particles and liquid droplets from air inflow into the air intake system.

In any one of the implementations above, the output power of the plunger pump may be 5000 hp or above.

In any one of the implementations above, the turbine fracturing semi-trailer system may further include 3 or more axles installed beneath the semi-trailer body, wherein each axel is installed with at least a pair of wheels.

In any one of the implementations above, the turbine fracturing semi-trailer system may further include a hydraulic power unit disposed on a gooseneck portion at one end of the semi-trailer body, the hydraulic power unit is configured to drive a hydraulic system in the turbine fracturing semi-trailer system.

In any one of the implementations above, the hydraulic power unit may be driven by a diesel engine or driven by an electric motor.

In any one of the implementations above, a cooling system may be collocated with the hydraulic power unit on the gooseneck portion of the semi-trailer body, the cooling system being configured to cool engine oil or lubrication oil displaced by the hydraulic power unit for an operation of the turbine engine, the first reduction gearbox assembly, or the plunger pump.

In any one of the implementations above, the crankcase of the plunger pump may include at least 6 axle journals and at least 5 bellcranks.

In any one of the implementations above, a distance between a first center of rotation of the at least 5 bellcranks and a second center of rotation of a crankshaft of the crankcase may be between 120 and 160 mm.

In any one of the implementations above, a plunging stroke of the plunger pump may be between 10 and 12 inches when being in operation.

In any one of the implementations above, the plunger pump may be disposed on a lapping section of the semi-trailer body and wherein the lapping section is configured with traction pin for attachment to a towing equipment for the turbine fracturing semi-trailer system.

Compared with the existing systems, the beneficial of the implementations disclosed herein includes, among others, at least (1) the turbine engine, the reduction gearbox, the transmission mechanism and the plunger pump are connected in a straight line along the transmission direction of power to avoid excessive transmission loss, thus ensuring efficient transmission performance; (2) the turbine engine is compact, light-weight, and of high-power density and thus for the same outline dimensions and weights, the unit power of the turbine fracturing equipment can be more than twice that of conventional diesel engine fracturing equipment; (3) the turbine engine can use 100% natural gas as the fuel directly, greatly reducing the fuel-cost compared to the diesel engines and no gas generator sets are needed; (4) the turbine engines drive the plunger pumps driven one-to-one with failure risk distribution rather than having a single failure point; (5) the reduction gearbox design achieves high reduction ratio with a compact construction and integrable to the plunger box and with a multi-planetary gear design having a low center of mass.

The present invention will be described in detail below with reference to the accompanying drawings and specific implementations.

DESCRIPTION OF THE EMBODIMENTS

The present disclosure is directed to a system for fracturing operation in oil/gas fields. The disclosed fracturing system is integrated onto a semitrailer that can be conveniently transported to any oil field. The disclosed fracturing system further includes major components needed for delivering high-pressure fracturing fluid into a wellhead, including but not limited to at least one power generation source and at least one plunger pump driven by the at least one power generation source via simple transmission mechanisms utilizing reduction gearbox and/or transmission shafts. The power generation source, in particular, includes a turbine engine capable of being powered by 100% natural gasified liquid fuel. The fracturing system further includes hydraulic and cooling component for serving the various needs for the turbine engine, the reduction gearbox, and the plunger pump, such as lubrication of various moving parts.

In comparison to traditional diesel engine-based or electric motor-based fracturing systems, benefits of the system described in the present disclosure include at least: (1) lower power transmission loss (e.g., because the turbine engine, the reduction gearbox, the transmission mechanism and the plunger pump are connected in a straight line along the transmission direction of power, excessive transmission loss is avoided during operation, thereby providing efficient transmission performance); (2) smaller footprint, lower weight, higher operating efficiency, and higher power density (e.g., the turbine engine is smaller and light-weight compared to traditional diesel engine, or diesel engine-powered electric generator, and is thus characterized by higher power density in that, for example, the unit power generated by the turbine fracturing equipment disclosed herein can be more than twice that of conventional diesel engine fracturing equipment with similar dimensions, footprint, and weight); (3) lower operational cost (e.g., because the turbine engine can directly use 100% natural gas, fuel cost is greatly reduced in comparison to cost of diesel fuel in a diesel engine or equivalent cost of investment if a gas powered electric generator is used as the power source), (4) failure risk distribution and reduced downtime (e.g., because the turbine engine in the system described herein is usually operated with the plunger pump in a one-to-one correspondence with a simple transmission and coupling mechanism, power source failure risk at a well site utilizing multiple sets of such systems is thus lower due to risk distribution in comparison to a traditional system where a single high-power gas electric generator set is used to drive multiple plunger pumps and where the system may suffer single-point failure).

Figure 1:
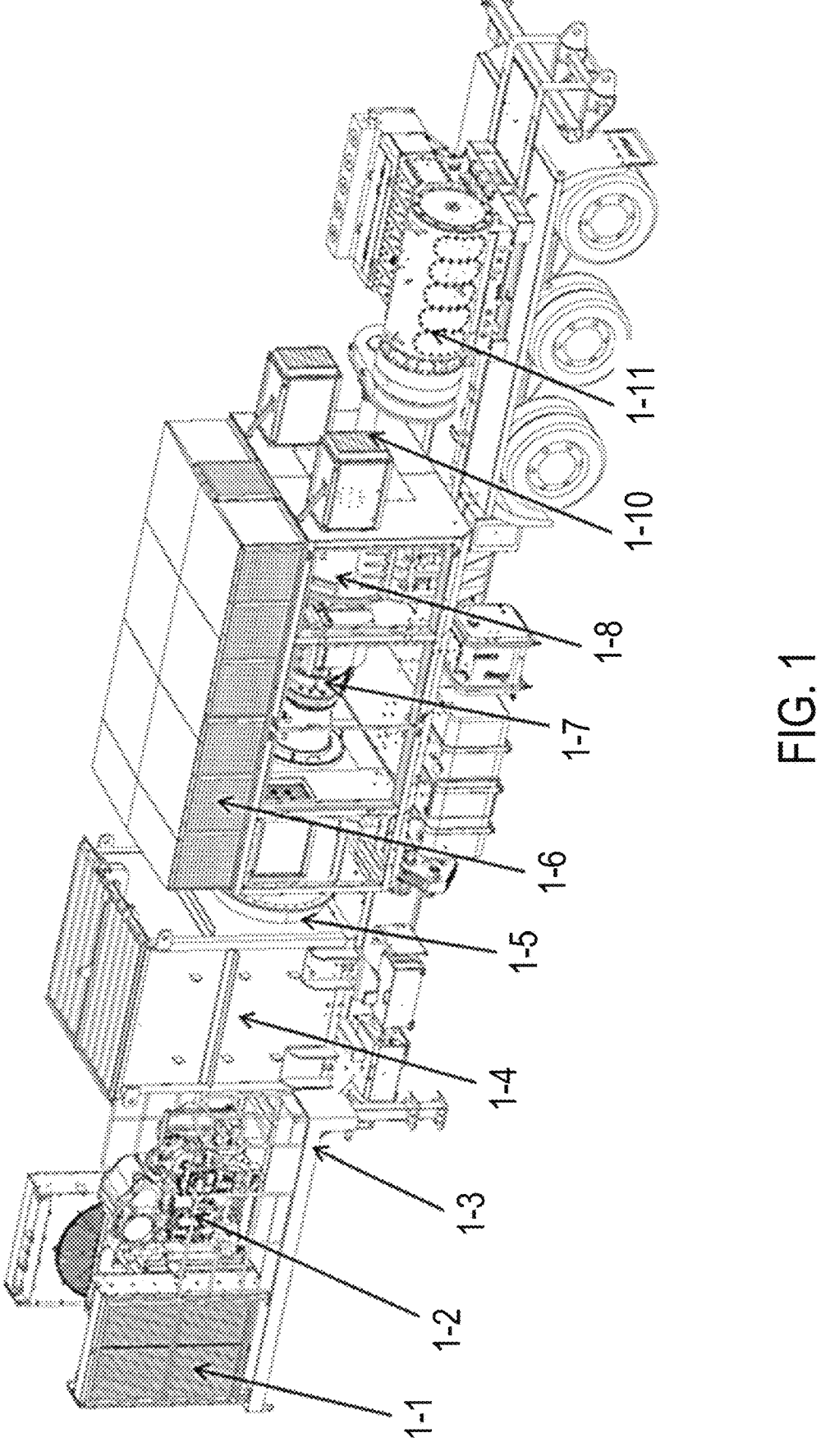
FIG. 1 shows a schematic structural diagram of an example turbine fracturing semi-trailer system.

An example turbine-based fracturing system disposed on a semi-trailer platform is illustrated in FIG. 1. As shown in FIG. 1, the example fracturing system may be implemented as a turbine fracturing semi-trailer platform, including a semi-trailer body 1-3, a turbine engine 1-7, a reduction gearbox 1-8, and an integrated transmission mechanism and a plunger pump 1-10, wherein the turbine engine 1-7 functions as the power source of the power transmission system of the entire semi-trailer system. The turbine engine 1-7, the reduction gearbox 1-8, the transmission mechanism and the plunger pump 1-10 are disposed on the semi-trailer body 1-3. The semi-trailer body 1-3 may also be provided with other components such as batteries, wiring/cabling, a fuel tank, a lubricating oil tank, a hydraulic oil tank and other components for providing service and support (e.g., lubrication, cooling, and the like) for the other components such as the turbine engine 1-7, the reduction gearbox 1-8, and the plunger pump 1-10. An output end of the turbine engine 1-7 may be connected to the reduction gearbox 1-8. The reduction gearbox 1-8 and the plunger pump 1-10 may be connected through a transmission mechanism. The transmission mechanism may be integrated with the reduction gearbox 1-8, as will be described in more detail below (even though, in some other alternative implementations, the transmission mechanism may be separate from the reduction gearbox 1-8). In some other implementations as described below the reduction gearbox may be integrated with the plunger pump and in such implementations, the output end of the turbine engine may be connected to the reduction gearbox integrated with the plunger pump via a transmission mechanism (a transmission shaft, or the like). The reduction gearbox 1-8 is used to slow down the rotational speed and increase the torque of the power output of the turbine engine 1-7 for driving the plunger pump 10 via the transmission mechanism or directly.

The turbine engine 1-7 may be provided with an exhaust system disposed on an end of the turbine engine in an opposite side of the power output end facing the reduction gearbox 1-8. The exhaust system may include an exhaust silencer 1-4 and exhaust piping/duct 1-5. The exhaust silencer 1-4 may be coupled with a combustion exhaust port (or an exhaust port, for simplicity) of the turbine engine 1-7 through the exhaust piping/duct 1-5. The exhaust piping/duct 1-5 may be used to direct combustion exhaust of the turbine engine 1-7 into the exhaust silencer 1-4. The exhaust silencer 1-4 can be configured with flow damping chambers and structures that help reduce noise generated by exiting combustion exhaust during an operation of the turbine engine 1-7. The exhaust silencer 1-4 may be alternatively referred to as an exhaust muffler.

As shown in the example of FIG. 1, the exhaust system, the turbine engine 1-7, the reduction gearbox 1-8, the transmission mechanism and the plunger pump 1-10 may be disposed in a straight line along the transmission direction of mechanical power. In particular, the turbine engine 1-7, the reduction gearbox 1-8, the transmission mechanism and the plunger pump 1-10 are coupled in a straight line along the transmission direction of power to avoid transmission complexity and excessive transmission loss, thereby enabling efficient transmission performance. Moreover, such a configuration can lower the center of gravity of the fracturing equipment on the semi-trailer body for achieving easier and more stable transportation of the semi-trailer. The turbine engine 1-7 is by itself advantageous because of its smaller size, lighter weight and higher power density over direct-drive diesel engine or a combination of electric generator driven by a diesel engine or a turbine engine. For similar outer dimensions, footprint, and weight, the unit power generation of the turbine fracturing equipment disclosed herein can be more than twice of that of conventional diesel engine fracturing equipment. The turbine engine 1-7 can further directly use 100% natural gas as the fuel, which greatly reduces operating cost of the system compared to the cost of diesel consumption associated with diesel engine or the cost of gas generator sets when being used to drive the plunger pump. The turbine engine 1-7 also can use 100% oil fuel or other types liquid fuels.

In addition, as shown in FIG. 1, the turbine engine 1-7 may be configured to drive the plunger pumps 1-10 in a one-to-one correspondence. Unlike the implementations of electrically driven fracturing equipment in which a single high-power gas generator set is used to drive multiple plunger pumps, multiple sets of the one-to-one turbine plunger pump system described above in FIG. 1 can be used in an oil/gas field collaboratively and can effectively avoid single point failure. In other words, the failure risk is distributed such that failure of one turbine engine would not stop the entire fracturing system from continuing using other separate turbine engines whereas failure of the single generator in the traditional system would shut shown the entire operation.

As shown in the example of FIG. 1, an air intake system 1-6 is disposed on the semi-trailer body 3, the air intake system 1-6 includes an air intake filter, an air intake silencer and an air intake piping/duct. One end of the air intake silencer may be connected to the air intake filter, whereas the other end of the air intake silencer may be connected to one end of the air intake piping/duct. The other end of the air intake piping/duct may be coupled to and connected with an air intake port of the turbine engine 1-7.

In some implementations, the air intake system including the air filters may be disposed on top of the turbine engine and extended over the entire turbine engine 1-10 in a parallel plane of the semi-trailer platform, as shown in FIG. 1. In some implementations, the peripherals of the air intake system along at least two sides indicated by the shaded area in FIG. 1 may be installed with continuous group of air filters. In some implementations, additional inertia separator structures may be installed in front of the filters to remove solid particles and liquid droplets from the intake air. External air flow may flow through the inertia separator and the air filters into the air intake system and may be guided into the air intake port of the turbine engine 1-10.

The power of the plunger pump 1-10 may be designed and rated at 5000 hp or above. In general, the greater the power of the plunger pump 1-10 is, the more suitable it is to use the plunger pump for lone-time and high-load continuous operation conditions.

The transmission mechanism may be implemented as a transmission shaft 1-9 or other types of coupling, as described in more detail below.

The number of axles of the semi-trailer body may be 3 or above, to ensure an adequate bearing capacity. Each axle may be installed with two or more wheels. As shown in the example implementation of FIG. 1, at least one of the axles may be disposed at the rear portion of the semi-trailer underneath the plunger pump, as the plunger pump may constitute a relatively heavier component of the fracturing system.

As shown in the example of FIG. 1, a hydraulic power unit 1-2 may be disposed on a gooseneck of the semi-trailer body 1-3. The gooseneck of the semi-trailer in the particular example of FIG. 1 may be on the opposite end from the axels and wheels of the semi-trailer and may be where the semi-trailer can be attached to a tractor for transportation. The hydraulic power unit 1-2 may be used to drive the hydraulic system on the turbine fracturing semi-trailer. The hydraulic system may include a hydraulic pump, a hydraulic motor, various valves, a hydraulic oil tank, a hydraulic oil radiator, etc. The main role of the hydraulic system is to drive the fuel pump of the turbine engine 1-7, the starting motor of the turbine engine 1-7, the power end lubrication system of the plunger pump 1-10, the lubrication system of the reduction gearbox 1-8, various oil radiators and the like.

In some example implementations, the hydraulic power unit 1-2 may be a diesel engine, or another type of internal combustion engine, or an electric motor. The diesel engine or other type of internal combustion engine may only be sufficiently configured to achieve the limited function above. The electric motor, when being used, may draw power from a chargeable battery, or may be powered by electricity delivered to the well site through, for example, an electric grid, or from a separate onside electrical generator system.

A cooling system 1-1 may be disposed on the gooseneck of the semi-trailer body 1-3, the cooling system 1-1 may be configured to cool oils used on the turbine fracturing semi-trailer. The oils being cooled by the cooling system 1-1 include engine oil and the hydraulic oil described above for the turbine engine 1-7, lubricating oil for the plunger pump 1-10, lubricating oil for the reduction gearbox 1-8, and the like. In some implementations, the engine oil or lubrication oil may be circulated from the hydraulic system disposed on the gooseneck section of the semi-trailer body 1-3 to the cooling system and then to the turbine engine 1-7 or the reduction gearbox 1-8, or the plunger pump 1-10, and then back to the hydraulic unit. Alternatively, the engine oil or lubrication oil may be circulated from the hydraulic system disposed on the transport section/gooseneck section of the semi-trailer body 1-3 to the turbine engine 1-7 or the reduction gearbox 1-8, or the plunger pump 1-10, and then to the cooling system, and back to the hydraulic unit.

Figure 2:
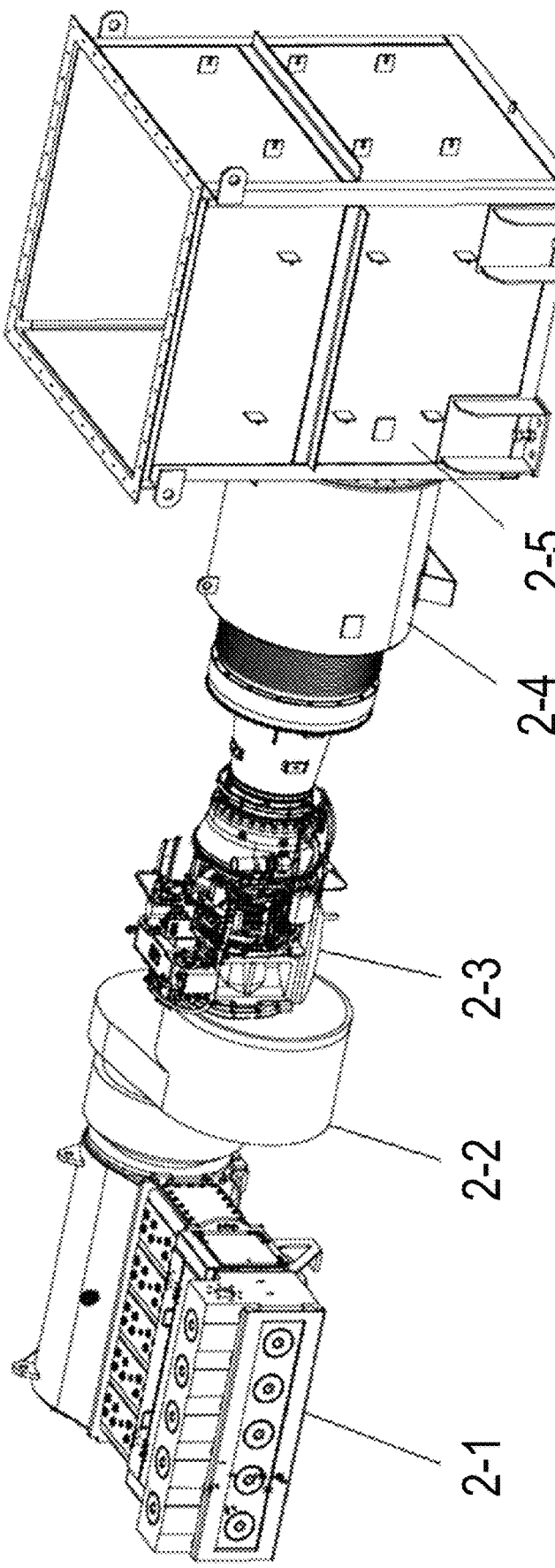
FIG. 2 illustrates a schematic structural diagram of an example semi-trailer-loaded turbine fracturing system.

FIG. 2 show an example for direct drive of the gearbox and plunger pump by the turbine engine. As shown in FIG. 2, the example power drive system may include a turbine engine 2-3, an exhaust system and a fracturing pump 2-1, wherein one end of the turbine engine 2-3 is connected to the exhaust system; and the other end of the turbine engine 2-3 is connected to the fracturing pump 2-1. The fracturing pump 2-1 may be integrated with a reduction gearbox 2-2. The turbine engine 2-3 may be directly connected to an input end of the reduction gearbox 2-2 on the fracturing pump 2-1. The power drive system for the fracturing pump 2-1 is thus directly driven by a turbine engine 2-3, via the reduction bear box 2-2 without additional transmission mechanism. The turbine engine 2-3 can use 100% natural gas as the fuel rather than diesel fuel, thereby lowering fuel costs. In addition, the turbine engine 2-3 may be advantageously associated with a small volume and light weight, which greatly decreases the overall volume, footprint, and weight of the entire power drive system for the fracturing pump 2-1.

As shown in FIG. 2, the turbine engine 2-3 may be directly connected to an input end of the reduction gearbox 2-2. The reduction gearbox 2-2, in some example implementations, may be integrated as part of the fracturing pump 2-1. An input speed of the reduction gearbox 2-2 of the fracturing pump 2-1 may be configured to match an output speed of the turbine engine 2-3. Further, an input torque of the reduction gearbox 2-2 of the fracturing pump 2-1 may be configured to match an output torque of the turbine engine 2-3. A particular example construction and configuration of the reduction gearbox 2-2 is described in more detail below. Such direction connection of the reduction gearbox 2-2 implementation with the turbine engine 2-3 thus simplifies the transmission device between the fracturing pump 2-1 and the turbine engine 2-3. In other words, a transmission shaft or a coupling may be omitted, greatly shortening the total length of the power drive system for the fracturing pump 2-1. In the example of FIG. 2, the turbine engine 2-3 is used as the power source, the transmission device is implemented as the reduction gearbox 2-2 which may be equipped or integrated on the fracturing pump 2-1 itself, and the fracturing pump 2-1 is also pre-fitted together with turbine engine 2-3. As such, the power drive system for the fracturing pump is configured as a simple structure that is easy to maintain.

As shown in the implementation of FIG. 2, the fracturing pump 2-1, the turbine engine 2-3 and the exhaust system (including the exhaust duct 2-4 and silencer 2-5 as described below) may be disposed in a straight line along the transmission direction of mechanical power.

The exhaust system illustrated in FIG. 2 may include an exhaust duct 2-4 and an exhaust silencer 2-5. As shown in FIG. 2, one end of the exhaust duct 2-4 may be connected to the exhaust silencer 2-5, and the other end of the exhaust duct 2-4 may be connected to an exhaust port of the turbine engine 2-3.

The configuration in which the fracturing pump 2-1, the turbine engine 2-3, the exhaust duct 2-4 and the exhaust silencer 2-5 are disposed in a straight line along the transmission direction of power may particularly help avoid excessive transmission power loss that may be associated with more complex transmission mechanisms for direction change of the mechanical power, thus enabling efficient transmission performance of the fracturing equipment.

Figures 3, 4:
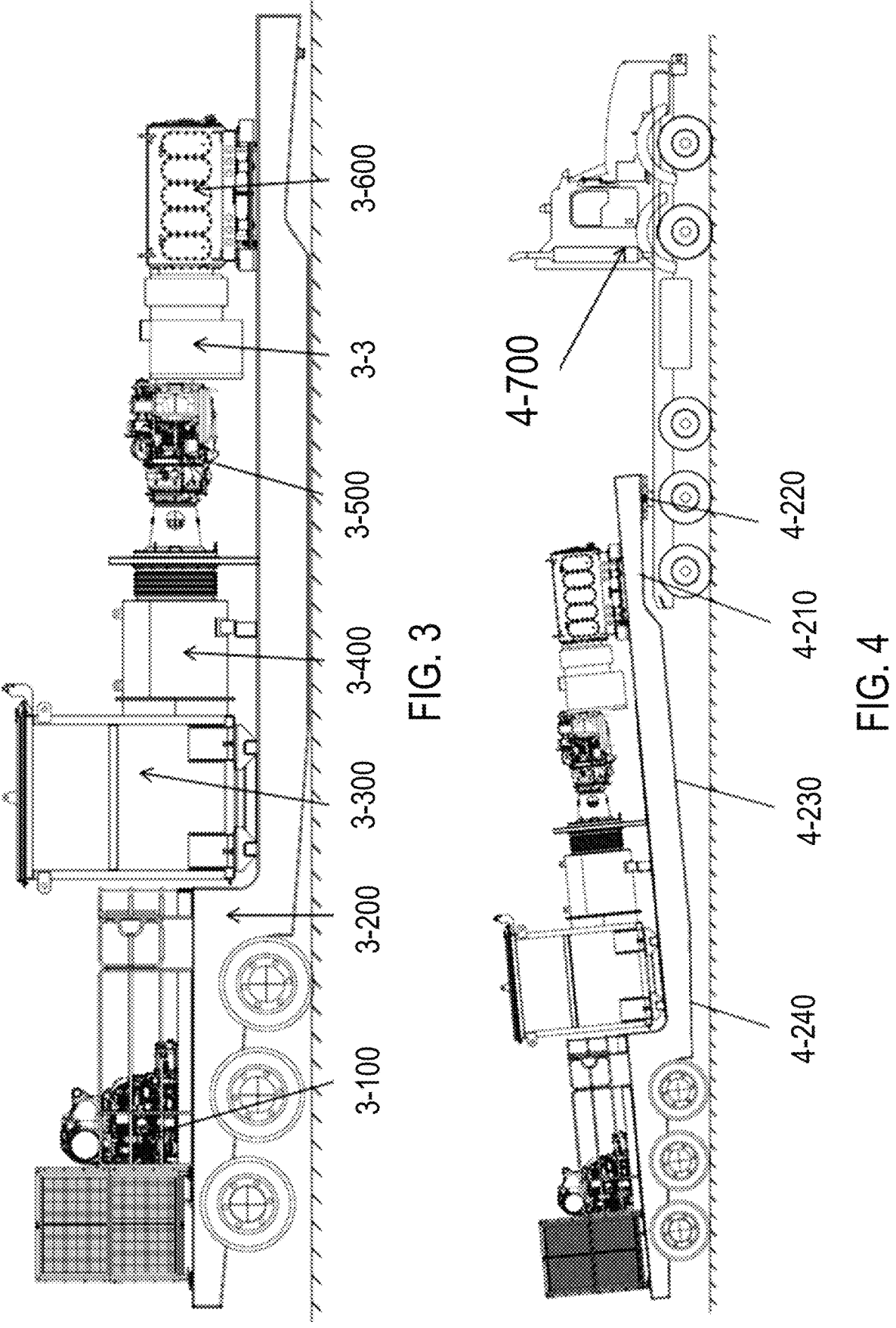
FIG. 3 shows a schematic structural diagram of another example turbine fracturing semi-trailer system in an operation or storage configuration.
FIG. 4 shows a schematic structural diagram of the example turbine fracturing semi-trailer system of FIG. 3 in a transport configuration

FIG. 3 and FIG. 4 shows an example of a turbine-based fracturing system including the turbine engine, reduction gearbox, and plunge pump configuration of FIG. 2. FIG. 3 particular shows such a fracturing system being disposed on a semi-trailer in a resting mode for operation or storage whereas FIG. 4 shows the same fracturing system disposed on the semi-trailer, with the semi-trailer being attached to a tractor in a transportation mode. FIGS. 5-10 shows an example construction of a plunger pump and an example construction of the reduction gearbox that may be integrated with the plunger pump.

As shown in FIG. 3, the semi-trailer-loaded turbine fracturing system may include a transporter 3-200, an exhaust system, a turbine engine 3-500 and a plunger pump 3-600. The turbine engine 3-500 functions as the mechanical power source for the power transmission system of the whole equipment, which may be directly fueled by 100% natural gas rather than other types of fuels, which greatly reduce the operational cost compared with the cost of diesel consumption in a diesel-driven system and the cost of having to invest on gas generator sets in the electricity driven fracturing system. Alternatively, the turbine engine 3-500 can also use 100% oil or other liquid fuel if needed.

As further shown in FIG. 3, the exhaust system may be connected to an exhaust port of the turbine engine 3-500. An output end of the turbine engine 3-500 may be connected to the plunger pump 2-600. The power output end and the exhaust system may be disposed on two opposite ends of the turbine engine 3-500. The exhaust system, for example, may include an exhaust silencer 3-300 and an exhaust duct 3-400. The exhaust silencer 3-300 may be connected to the exhaust port of the turbine engine 3-500 through the exhaust duct 3-400. The exhaust duct 3-400 may be used to direct the exhaust (e.g., combustion exhaust) of the turbine engine 3-500 into the exhaust silencer 3-300, which can reduce the noise from the exiting combustion exhaust of the turbine engine 3-500. As shown in FIG. 3, the exhaust system (including the exhaust silencer 3-300 and the exhaust duct

3-400), the turbine engine 3-500, and the plunger pump 3-600 may be disposed in a straight line along the transmission direction of the mechanical power, so as to avoid excessive transmission loss, and to enable an efficient transmission performance and to further lower the center of gravity of the equipment for improved operational and transportation safety and stability.

As shown in FIG. 3, the transporter 3-200 (or the main semi-trailer platform) may be used to support and at affix the exhaust system, the turbine engine 3-500 and the plunger pump 3-600. As further shown in FIG. 5, the plunger pump 3-600 may include a power end assembly 5-1, a hydraulic end assembly 5-2 and a reduction gearbox assembly 5-3 (as integrated in the plunger pump assembly). One end of the power end assembly 5-1 may be connected to the hydraulic end assembly 5-2. The other end of the power end assembly 5-1 may be connected to the reduction gearbox assembly 5-3. The reduction gearbox assembly 5-3 may include one or more planetary reduction gearsets (or gearboxes) and one or more parallel reduction gear sets (or gearboxes). The planetary reduction gear sets (or gearboxes) may be used in conjunction with the parallel reduction gear sets (or gearboxes) to obtain a transmission ratio of 60:1 to 106:1. The turbine engine 3-500 may be connected to the reduction gearbox assembly 3-3 (or 5-3). The reduction gearbox assembly 3-3/5-3 may be used to slow down the rotational speed and increase the torque of the power output of the turbine engine 3-500 for driving the plunger pump 3-600. The transporter 3-200 may be further provided with components disposed thereon such as batteries, wiring/cabling, a fuel tank, a lubricating oil tank, a hydraulic oil tank and the like, providing lubrication and/or cooling service and support to the other components such as the turbine engine 3-500, the plunger pump 3-600, and the like.

In some example implementations as shown in FIGS. 5-10, there may be two planetary reduction gearboxes in the reduction gearbox assembly 3-3 (or 5-3), including a first planetary reduction gearbox 6-9 and a second planetary reduction gearbox 6-11. One end of the first planetary reduction gearbox 6-9 may be connected to a crankshaft 10-7 of the power end assembly 5-1. The other end of the first planetary reduction gearbox 6-9 is connected to the parallel reduction gearbox 6-10. The other end of the parallel reduction gearbox 6-10 may be connected to the second planetary reduction gearbox 6-11. The other end of the second planetary reduction gearbox 6-11 may be connected to the transmission shaft of the turbine engine 3-500. When in operation, the kinetic energy transferred by the transmission shaft of the turbine engine 3-500 is first reduced in rotational speed by the second planetary reduction gearbox 9-11, and is then decreased in rotational speed by the parallel reduction gearbox 6-10, and finally decreased om rotational speed by the first planetary reduction gearbox 6-9 for a third time.

For example, the transmission ratio of the reduction gearbox assembly 3-3 may be designed and adjusted to elevate the maximum input speed (e.g., increasing from the current 2100 rpm to 16000 rpm). The connection between the current turbine engine 3-500 and the plunger pump 3-600 through two reduction gearboxes and one transmission shaft is improved so that the turbine engine 500 can be directly connected to the reduction gearbox assembly 3-3 on the plunger pump 3-600, which not only satisfies the rotation speed reduction requirements, but also simplifies the transmission and driving structure of the whole fracturing equipment. Such implementations help reduce the length dimension or the system and provide a system that is of lower cost and is easier to manage, maintain and transport.

Figures 5, 6:
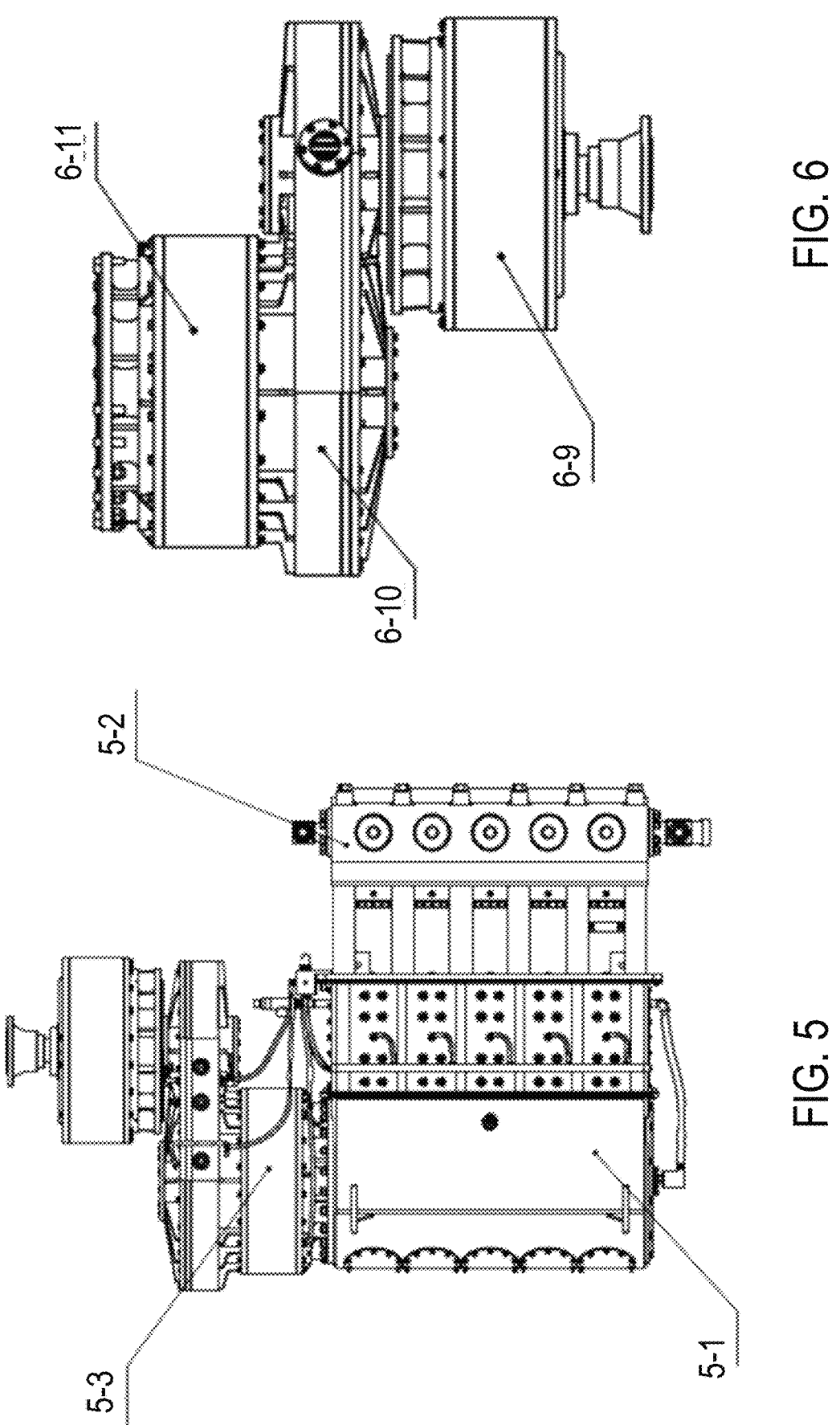
FIG. 5 shows a schematic structural diagram of an example plunger pump.
FIG. 6 is a schematic structural diagram of an example reduction gearbox assembly.

The example above using two sets of planetary gearboxes and a parallel gearset in between enables transmitting the output rotation of the turbine engine to the plunger pump without direction change but with an offset. In particular, the rotational axis of the turbine engine output is parallel to the same rotational direction of the input end of the plunger pump but not coaxial. The rotational axis of the plunger pump may refer to a rotational axis of the crankshaft 10-7 within a crankcase 9-4 of the plunger pump as described in further detail below. The offset between the rational axis of the output of the turbine engine and the rotational axis of the input of the plunger pump may be determined by the distance between the center of the first planetary gearbox 6-9 and the center of the second planetary gearbox 6-11 as shown in FIG. 6. The offset, for example may be configured in the horizontal plane, such that the shift of rotational axis between the turbine engine and the input of the plunger pump is in the horizontal plane rather that being a vertical offset. In some other implementations, the offset between the rotational axis of the turbine engine and the axis of the plunger pump may be more in the horizontal direction than vertical direction (e.g., a plane formed by these two rotational axes may be less than 45 degrees from the horizontal plane when the fracturing system is in operation. In such a manner, the rational center of the entire turbine engine and plunger pump system need to rise vertically. The center of gravity of the entire system thus may be kept low, thereby increasing operational and transportation safety.

Figures 7, 8:
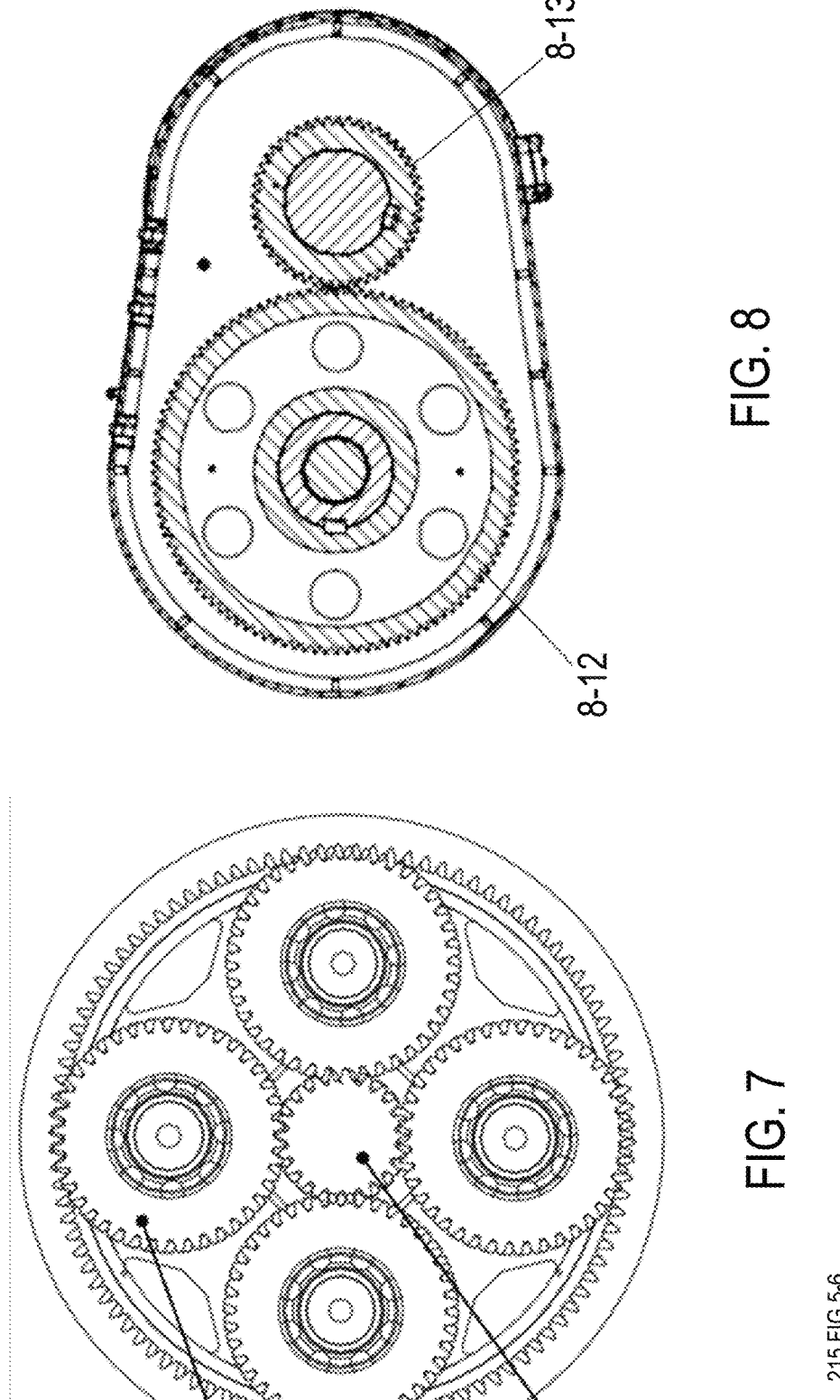
FIG. 7 shows a cross-sectional view of an example planetary reduction gearset.
FIG. 8 shows a cross-sectional view of an example parallel reduction gearset.
Figure 10:
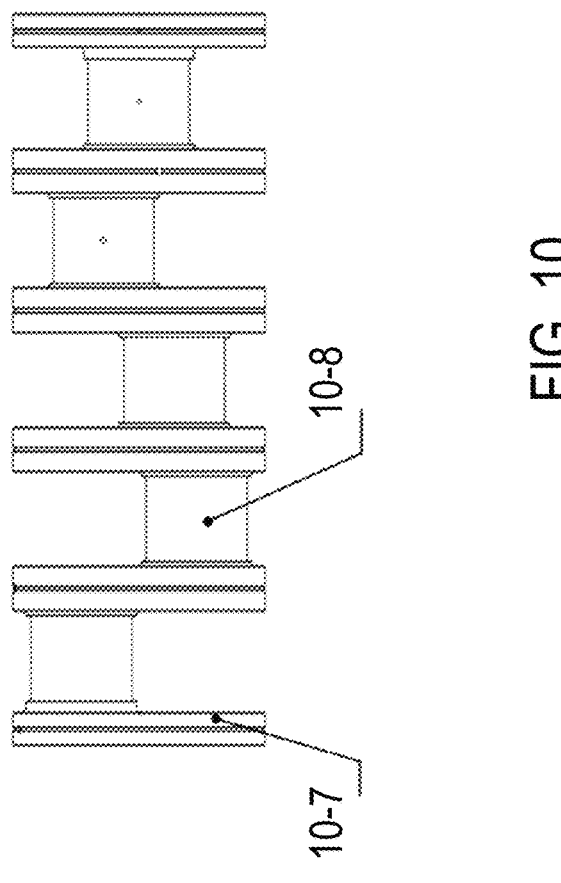
FIG. 10 shows a schematic structural diagram of an example crankshaft in a crankcase of a plunger pump.

As an example of the planetary gearboxes above and as shown in FIG. 7, The planetary reduction gearbox may include one sun gear 7-16, four planetary gears 7-14 and one gear ring 7-15. The four planetary gears 7-14 may form a planetary gear mechanism. The sun gear 7-16, for example, may be located at the center of the planetary gear mechanism. The planetary gears 7-14 and the adjacent sun gear 7-16 and gear ring 7-15 may be in configured in a normally engaged state. The example planetary reduction gearbox of FIG. 7 may use four (or other number of) evenly distributed planetary gears 7-14 to transmit motion and power simultaneously. The centrifugal inertia force generated from the revolution of the four planetary gears 7-14 offsets the radial component of a counterforce between the tooth contours, thereby reducing the force on the main shaft and helping achieve high power transmission.

As shown in FIG. 8, the parallel reduction gearbox 6-10 may include a pinion 8-13 and a bull gear 8-12. The pinion 8-13 may be coaxial with the sun gear 7-16 of the first planetary reduction gearbox 6-9, and the bull gear 8-12 may be coaxial with the sun gear 7-16 of the second planetary reduction gearbox 6-11. The mechanical power generated by the turbine engine is transmitted to the bull gear 8-12 through the pinion 8-13 in the parallel reduction gearbox 6-10 to realize the reduction.

In some example implementation, an input angle of the reduction gearbox assembly 3-3 can be adjusted according to input requirements.

While the example above in FIGS. 3-8 shows a direct drive of the plunger pump by the turbine engine via the reduction gearbox without other driving shafts, in some other example implementations, with respect to FIG. 5, the other end of the power end assembly 5-1 may be connected to the reduction gearbox assembly 5-3 through a spline or a flexible coupling.

Figure 9:
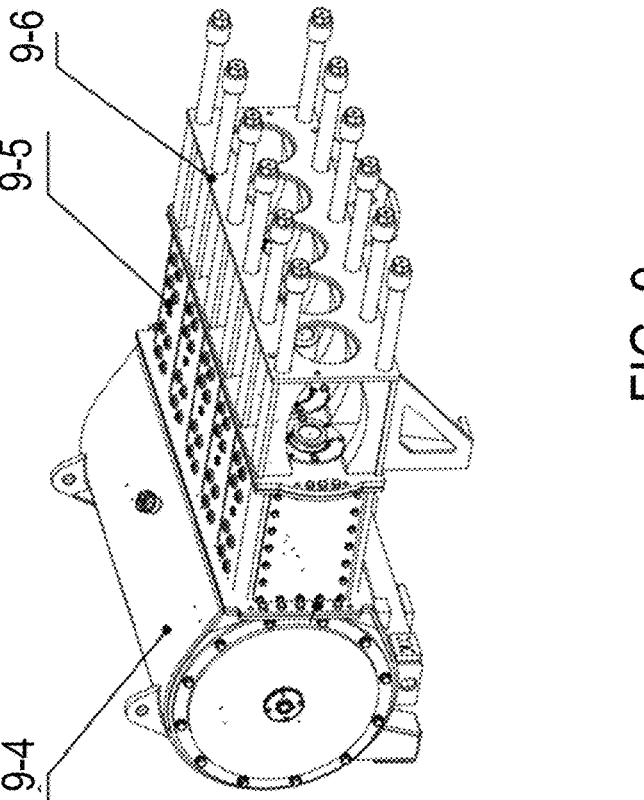
FIG. 9 shows a schematic structural diagram of an example power end assembly of a plunger pump.

As shown in FIG. 9, the power end assembly 5-1 of the plunger pump may be s designed to be a segmented structure so that the power end assembly 5-1 has a compact overall structure and can be manufactured in an easy manner, and that the assembly and maintenance of the whole plunger pump become more convenient. In the meanwhile, the processing cost may be reduced.

The power end assembly 5-1 may include a crankcase 9-4, a crosshead case 9-5 and a spacer frame 9-6. One end of the crosshead case 9-5 may be connected to the crankcase 9-4, whereas the other end of the crosshead case 9-5 may be connected to the spacer frame 9-6. In some implementations, the hydraulic end assembly 5-2 may be disposed at one end of the spacer frame 9-6 and may be connected to the crankcase 5-4 through bolts sequentially passing through the spacer frame 9-6 and the crosshead case 9-5. The reduction gearbox assembly 5-3 may be connected to the crankcase 9-4 through bolts. The crankshaft 10-7 in the crankcase 9-4 may be forged from alloy steel or other materials and may include six or other number of axle journals 10-7 and five or other number of bellcranks 10-8. One bellcrank 10-8 may be disposed between every two adjacent axle journals 10-7, yielding an example design of a five-cylinder structure. The design of the five-cylinder structure helps increase the output displacement of the plunger pump 3-600. Compared to a three-cylinder pump, the five-cylinder pump operates more smoothly with less vibration, thus reducing the vibration of the whole plunger pump and prolonging its service life. The distance between the center of rotation of the bellcrank 10-8 and the center of rotation of the crankshaft 10-7 may be set at 120 to 160 mm. The distance between the center of rotation of the bellcrank 10-8 and the center of rotation of the crankshaft 10-7 may be further adjusted to increase the maximum power of the plunger pump 3-600 to 5000-7000 hp, so that the plunger pump 3-600 can output a fracturing fluid of higher pressure, via a long plunging stroke. For example, the resulting plunging stroke may reach 10-12 inches. A large displacement of the fracturing liquid for the fracturing operation may be achieved, with a number of strokes of the pump being reduced, thereby further extending the service life of the components.

In some implementations, as shown in FIG. 4, the transporter 3-200 may include a chassis which is provided with a transport section, a bearing section and a lapping section which are connected in sequence. When the turbine fracturing equipment is in operation, the bearing section of the chassis can contact with the ground to provide a stable support. When the turbine fracturing equipment is in transport state, the bearing section of the chassis does not contact the ground and the lapping portion 4-210 of the transporter 3-200 may be attached to tractor 4-700 and the semi-trailer platform inclines upwards towards the lapping portion 4-210.

The transporter 3-200 may include wheels and axles. The wheels, for example, may be disposed at both ends of the axles. The axles may be connected to the chassis, the number of the axles may be 3 or above to provide a sufficient bearing capacity. The axles may be disposed at the transport section of the chassis.

As shown in FIG. 4, when the turbine fracturing equipment is in operation, the bottom of the bearing section of the chassis may be at the same level as the bottom of the wheels. The bottom of the bearing section may include a horizontal surface 4-230 plus a sloped surface 4-240 when the turbine fracturing equipment is in operation. The horizontal surface 230 at the bottom of the bearing section may be configured to be in full contact with the ground to increase the stability of the equipment in operations. The sloped surface 4-240 allows the raised chassis to be lifted off the ground for easy attachment to the tractor 4-700 when the turbine fracturing equipment is being transported.

As shown in FIG. 4, the bottom of the lapping section may be provided with a bevel 4-210 which may be further provided with a bulge 4-220. While the turbine fracturing equipment is being transported, the bevel 4-210 may be used in conjunction with external towing equipment, the bulge 4-220 may be configured to assist in fixing the transporter 4-200 on the external towing equipment and preventing the transporter 4-200 from separating from the external towing equipment. The external towing equipment may be a tractor 4-700, and the bulge 4-220 may be implemented as a traction pin used in conjunction with the tractor 4-700.

As shown in either FIG. 3 or FIG. 4, the transporter 4-200 may be further provided with a hydraulic power unit 3-100 which may be used to drive the hydraulic system on the turbine fracturing semi-trailer. The hydraulic system may include a hydraulic pump, a hydraulic motor, various valves, a hydraulic oil tank, a hydraulic oil radiator, and the like. The hydraulic system may be mainly used to drive the fuel pump of the turbine engine 3-500, the starting motor of the turbine engine 3-500, the lubrication system of the power end assembly 5-1 of the plunger pump 3-600, the lubrication system of the reduction gearbox assembly 5-3 of the plunger pump 3-600, and various oil radiators, and the like.

The hydraulic power unit 3-100 may be driven by a diesel engine or driven by an electric motor. The hydraulic power unit may be disposed on a gooseneck portion of the transporter, as shown in FIG. 3 and FIG. 4.

The transporter 3-200 may be further provided with a cooling system which cools the oil used on the turbine fracturing semi-trailer. The oil used may include but is not limited to the engine oil for the turbine engine 3-500, hydraulic oil, the lubricating oil for the plunger pump 3-600, and the like. The cooling system may be located on the gooseneck portion of the transporter, as shown in FIGS. 3-4.

In some implementations, the engine oil, the hydraulic oil, or lubrication oil may be circulated from the hydraulic system disposed on the gooseneck section of the transporter 3-200 to the co-located cooling system and then to the turbine engine 3-500 or the reduction gearbox 3-3, or the plunger pump 3-600, and then back to the hydraulic unit. Alternatively, the engine oil or lubrication oil may be circulated from the hydraulic system disposed on the transport section/gooseneck section of the transporter 3-200 to the turbine engine 3-500 or the reduction gearbox 3-3, or the plunger pump 3-600, and then to the cooling system, and back to the hydraulic unit.

Figures 11, 12:
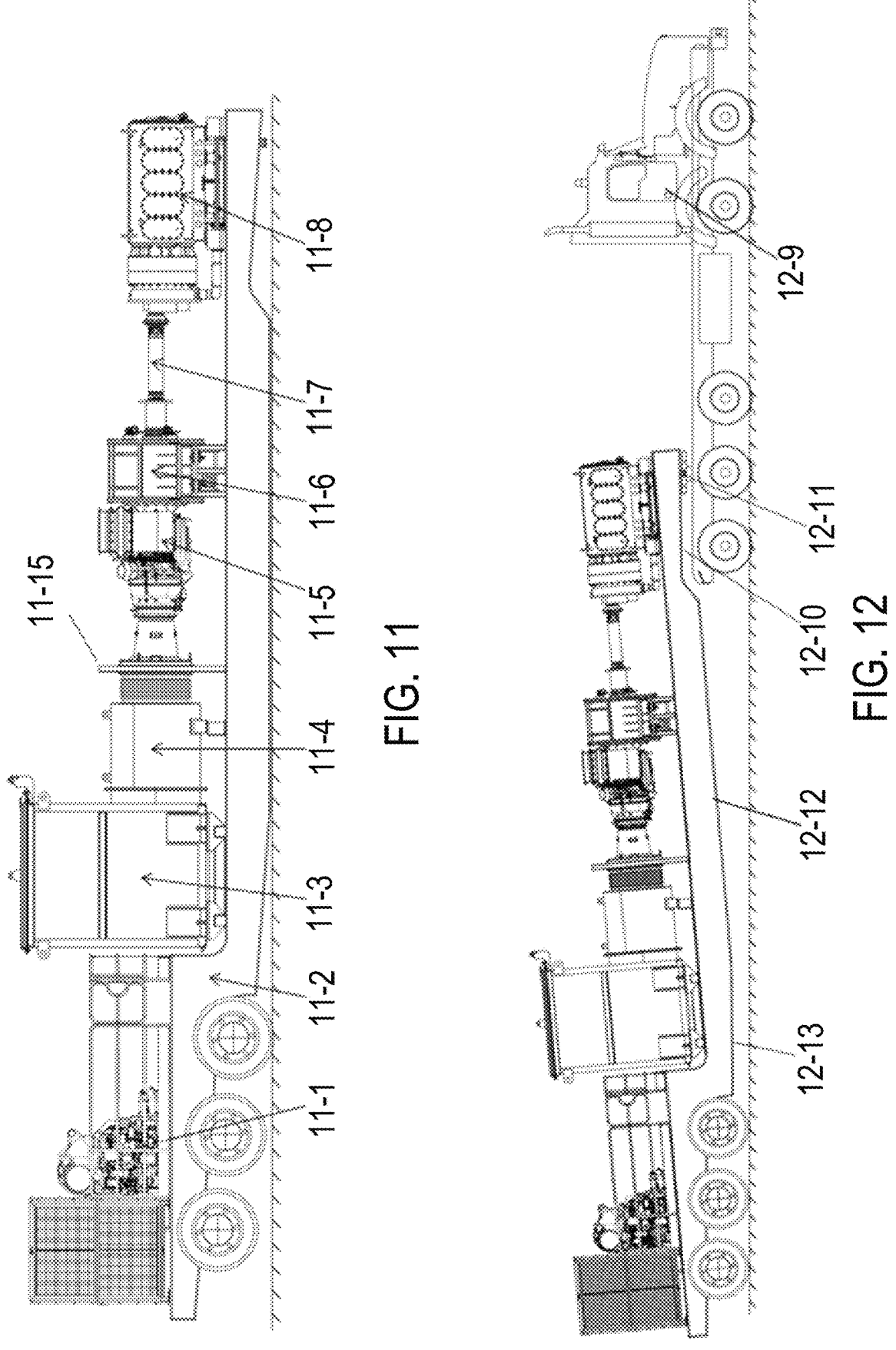
FIG. 11 shows a schematic structural diagram of another turbine fracturing semi-trailer system in an operational or storage state.
FIG. 12 shows a schematic structural diagram of the example turbine fracturing semi-trailer system of FIG. 11 in a transport state.

FIGS. 11 and 12 show another example implementation of the turbine-based fracturing equipment affixed on a semi-trailer platform. As shown in FIGS. 11 to 12, similar to the implementations above, a turbine fracturing equipment may include a transporter 11-2, a turbine engine 11-5, a reduction gearbox 11-6, a transmission mechanism 11-7 and a plunger pump 11-8. The turbine engine 11-5 functions as the power source for the power transmission system of the whole fracturing equipment/system. An output end of the turbine engine 11-5 may be connected to one end of the reduction gearbox 11-6. The other end of the reduction gearbox 11-6 may be connected to the plunger pump 11-8 through the transmission mechanism 11-7 rather than directly (similar to the example implementation of FIG. 1). The transporter 11-2 may be used to support the turbine engine 11-5, the reduction gearbox 11-6, the transmission mechanism 11-7 and the plunger pump 11-8. The transporter 11-2 may include a chassis provided with a transport section, a bearing section and a lapping section which may be connected in sequence.

When the turbine fracturing equipment is in operation, the bearing section of the chassis may be in contact with the ground. When the turbine fracturing equipment is in a transport state, the bearing section of the chassis does not contact the ground. The chassis may be further provided with components such as batteries, wiring/cabling, a fuel tank, a lubricating oil tank, a hydraulic oil tank and the like for providing service and support for the other fracturing components such as the turbine engine 11-5, the reduction gearbox 11-6, the plunger pump 11-8 and the like. The reduction gearbox 11-6 is used to slow down the rotational speed and increase the torque of the power output of the turbine engine 11-5 for driving the plunger pump 8 through the transmission mechanism 11-7.

In some implementation, as shown in FIG. 11, the turbine fracturing equipment/system may further include a vertical support 11-15 between the exhaust duct and the turbine engine 11-5, wherein the vertical support 11-15 is disposed on and in direct physical contact with a top surface of the chassis.

In some implementations, the transporter 11-2 may include wheels and axles. The wheels may be disposed at both ends of the axles. The axles may be connected to the or more chassis, to provide an adequate bearing capacity.

In some implementations, the axles may be disposed at the transport section of the chassis (e.g., towards the rear of the chassis).

As shown in FIG. 12, when the turbine fracturing equipment is in operation, the bottom of the bearing section of the chassis may be designed such it is at the same level as the bottom of the wheels. The bottom of the bearing section may include a horizontal surface 12-12 plus a sloped surface 12-13 when the system is in operation. The horizontal surface 12-12 at the bottom of the bearing section may be in full contact with the ground when in operation, thereby increasing the operating stability of the equipment. The sloped surface 12-13 allows for the chassis, when being raised at the lapping section, to be lifted off the ground for attachment with the traction 12-9 when the turbine fracturing equipment is in a transport state.

As shown in FIG. 12, the bottom of the lapping section may be further provided with a bevel 12-10 which is further provided with a bulge 12-11. When the turbine fracturing equipment is in the transport state, the bevel 12-10 can be used in conjunction with the external towing equipment such as the traction 12-9. The bulge 12-11 may assist in fixing the transporter 11-2 onto and preventing the transporter 11-2 from separating from the external towing equipment. The external towing equipment may be the tractor 9 and the like, and the bulge may be implemented in the form of a traction pin.

The turbine engine 11-5 may be provided with an exhaust system on an opposite side of the reduction gearbox 11-6. The exhaust system may include an exhaust silencer 3 and an exhaust duct 11-4. The exhaust silencer 11-3 may be connected to an exhaust port of the turbine engine 11-5 through the exhaust duct 11-4. The exhaust duct 11-4 may be configured to direct the combustion exhaust of the turbine engine 11-5 into the exhaust silencer 11-3, which can reduce the noise of the exhaust exiting from the exhaust system.

As shown in FIGS. 11 and 12, the exhaust system, the turbine engine 11-5, the reduction gearbox 11-6, the transmission mechanism 11-7 and the plunger pump 11-8 are disposed in a straight line along the transmission direction of power. The linear connection of the turbine engine 11-5, the reduction gearbox 11-6, the transmission mechanism 11-7 and the plunger pump 11-8 along the transmission direction of power can help reduction of excessive transmission loss, thus resulting in efficient transmission performance. The turbine engine 11-5 itself has the advantages of small volume, light weight and high-power density. For the same size and weight, the unit-power generation of a turbine fracturing equipment can be more than twice that of conventional diesel fracturing equipment. The turbine engine 11-5 can be fueled by 100% natural gas directly, greatly reducing the use cost compared with the diesel consumption in diesel drive and the cost of investment on gas generator sets of electric drive fracturing equipment. Of course, the turbine engine 11-5 can also use 100% fuel oil or another liquid fuel. As shown in FIG. 11, the turbine fracturing equipment may be configured to for a turbine engine to drive a plunger pump in a one-to-one manner rather than using a single power source to drive multiple plunger pumps, such as the scheme used in traditional electricity driven fracturing equipment, where a single high-power gas generator set is used to drive multiple plunger pumps. Multiple set of the turbine fracturing equipment/system described above may be operated collaboratively at a well site to avoid singe point failure and to distribute failure risk to each turbine fracturing equipment/system.

In some example implementations, the transmission mechanism 11-7 may be implemented as a transmission shaft or another type of coupling.

As shown in FIGS. 11 and 12, a hydraulic power unit 11-1 may be disposed on the transport section (e.g., the gooseneck section). The hydraulic power unit 11-1 may be used to drive the hydraulic system on the turbine fracturing equipment. The hydraulic system may include a hydraulic pump, a hydraulic motor, various valves, a hydraulic oil tank, a hydraulic oil radiator, and the like. The hydraulic system may be used to drive the fuel pump of the turbine engine 11-5, the starting motor of the turbine engine 11-5, the lubrication system at the power end of the plunger pump 11-8, the lubrication system of the reduction gearbox 11-6, and various oil radiators, and the like.

In some example implementations, the hydraulic power unit 11-1 may be driven by a diesel engine or driven by an electric motor.

As shown in FIGS. 11 and 12, a cooling system may be collocated with the hydraulic power unit on the transport section (e.g., the gooseneck section). The cooling system may be configured to cool the oil used on the turbine fracturing equipment. The oil used includes the engine oil for the turbine engine 11-5, hydraulic oil, the lubricating oil for the plunger pump 8, the lubricating oil for the reduction gearbox 11-6, and the like. In some implementations, the engine oil or lubrication oil may be circulated from the hydraulic system disposed on the transport section/gooseneck section of the transporter 11-2 to the cooling system and then to the turbine engine 11-5 or the reduction gearbox 11-6, or the plunger pump 11-8, and then back to the hydraulic unit. Alternatively, the engine oil or lubrication oil may be circulated from the hydraulic system disposed on the transport section/gooseneck section of the transporter 11-2 to the turbine engine 11-5 or the reduction gearbox 11-6, or the plunger pump 11-8, and then to the cooling system, and back to the hydraulic unit.

In some implementations of FIGS. 11-12, the power of the plunger pump 11-8 may be configured at 5000 hp or above. The higher the power of the plunger pump 11-8 is, the more suitable it is for lone-time and high-load continuous operation conditions.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention.

For example, as a variation of FIG. 11, the reduction gearbox may be located on the other side of the transmission device 11-7, in direct coupling with the plunger pump 11-8 or may be integrated with the plunger pump. In such variation, the end of the transmission device 11-7 that is connected to the reduction gearbox 11-6 may be instead direct coupled to the output end of the turbine engine 11-5.

For another example, as a variation of FIG. 11, an additional reduction gearbox may be integrated with the plunger pump 11-8. The transmission device 11-7 thus may be coupled to the integrated reduction gearbox on one side and the reduction gearbox 11-6 on the other end. The configuration with two reduction gearbox assemblies may help simply design of each of the reduction gearbox to achieve the rotational speed reduction and torque increase needed for the turbine engine to drive the plunger pump.

For another example, the positions of the various components disposed on the semi-trailer platform or the transporter are not limited by the disclosure above. For example, the plunger pump may be disposed towards either end of the transporter (in FIG. 1 the plunger pump is disposed towards the rear of the semi-trailer whereas the plunger pump of FIG. 3 or FIG. 11 is disposed towards the front of the transporter). Likewise, the gooseneck section of the transporter or the semi-trailer body may be located either in the front or rear end of the transporter or the semi-trailer body (e.g., the gooseneck portion is at the front end in FIG. 1, whereas the gooseneck portion is at the rear end in FIG. 3 and FIG. 11). When the gooseneck portion is in the front end, it may also function as a lapping section having the bulge in the form of, for example, a traction pin, as described above, for attachment to a towing equipment (e.g., a tractor).

All these and other changes and improvements shall fall within the protection scope of the present invention. The protection scope of the present invention is defined by the appended claims and equivalents thereof.

What is claimed is:

1. A turbine fracturing system, comprising:
   a turbine engine comprising a rotational output end having a first rotational axis;
   a pump having a rotational input end with a second rotational axis parallel to the first rotational axis; and
   a reduction gearbox integrated with the pump for coupling the rotational output end of the turbine engine and the rotational input end of the pump, the reduction gearbox comprises three stages of combined rotational speed reduction of a factor of 60 to 106 and configured to shift a transmission of power from the first rotational axis to the second rotational axis.

2. The turbine fracturing system of claim 1, wherein the reduction gearbox comprises at least two sets of planetary gearsets and a parallel gearset.

3. The turbine fracturing system of claim 1, wherein the turbine engine further comprises an exhaust system disposed on an opposite side of the reduction gearbox.

4. The turbine fracturing system of claim 3, wherein the exhaust system comprises an exhaust silencer and an exhaust piping, the exhaust silencer being communicated with an exhaust port of the turbine engine through the exhaust piping.

5. The turbine fracturing system of claim 3, wherein the pump, the turbine engine, and the exhaust system are supported by a chassis of a transportable platform.

6. The turbine fracturing system of claim 1, wherein the turbine engine is adapted to operate using 100% natural gas.

7. The turbine fracturing system of claim 1, wherein an air intake system is disposed on a platform above the turbine engine.

8. The turbine fracturing system of claim 7, wherein:

the air intake system comprises a plurality of air intake filters, an air intake silencer, and an air intake duct;

one end of the air intake silencer is connected to the plurality of air intake filters;

another end of the air intake silencer is connected to one end of the air intake duct; and another end of the air intake duct is connected to an air intake port of the turbine engine.

9. The turbine fracturing system of claim 8, wherein the plurality of air intake filters are disposed on two sides of the air intake system along a direction of power transmission of the turbine fracturing system and extend at least an entire length of the turbine engine.

10. The turbine fracturing system of claim 9, further comprising a plurality of inertia separators upstream of an intake air flow to the plurality of air intake filters for separating solid particles and liquid droplets from an air inflow into the air intake system.

11. The turbine fracturing system of claim 1, wherein output power of the pump is 5000 to 7000 hp.

12. The turbine fracturing system of claim 11, wherein the turbine engine is configured to be operable at 16000 rpm to drive the pump.

13. The turbine fracturing system of claim 1, wherein the pump comprises a plunger pump.

14. The turbine fracturing system of claim 13, wherein the plunger pump comprises at least a crankcase having at least 6 axle journals and at least 5 bellcranks.

15. The turbine fracturing system of claim 14, wherein center axis of the axle journals and the bellcranks are 120 to 160 mm apart.

16. The turbine fracturing system of claim 1, further comprising a hydraulic power engine configured to supply lubrication oil to at least the pump and the reduction gearbox.

17. The turbine fracturing system of claim 16, the hydraulic power unit is disposed on a gooseneck portion of a transportable platform hosting the turbine engine, the pump, and the reduction gearbox.

* * * * *